July 30, 1957 — M. A. WEST — 2,800,829
CRUCIFORM RECESSED SCREW
Filed Aug. 30, 1954
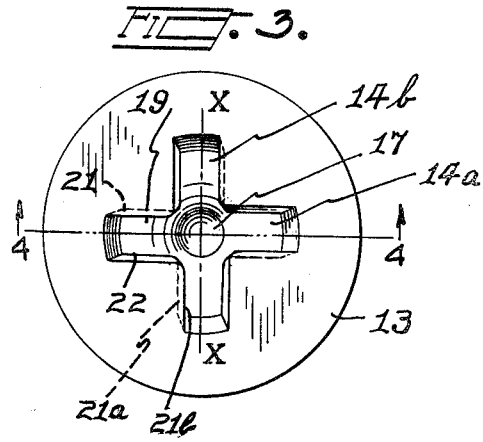
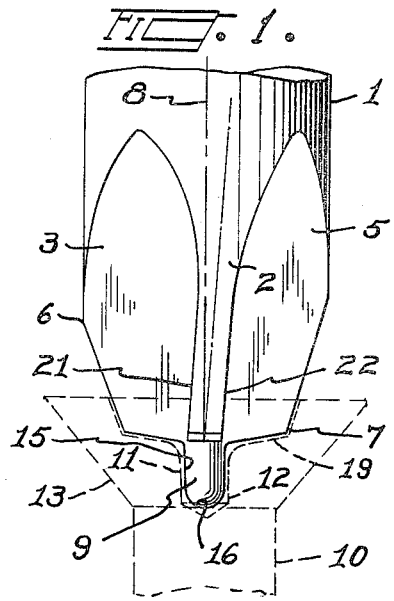
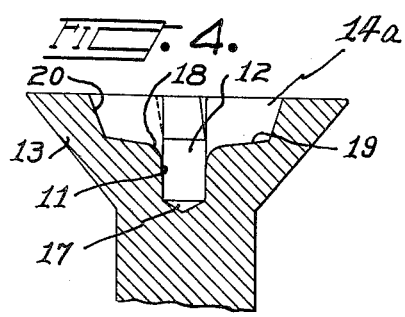
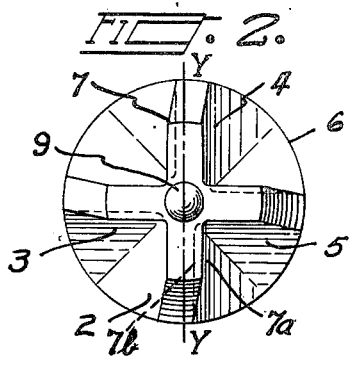
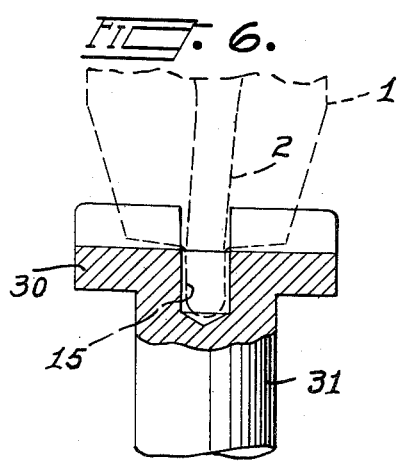
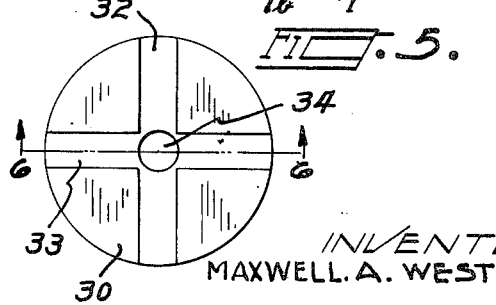
INVENTOR
MAXWELL. A. WEST
BY
ATTORNEY United States Patent Office 2,800,829
Patented July 30, 1957

2,800,829

CRUCIFORM RECESSED SCREW

Maxwell A. West, Portland, Oreg., assignor to Wesloc Screw, Inc., Portland, Oreg., a corporation of Oregon Application August 30, 1954, Serial No. 452,919

3 Claims. (Cl. 85—45)

This invention relates to new and useful improvements in fasteners, and more particularly in the configuration of a recess or socket formed in the head of a fastener such as a screw, bolt or the like, and in a driver or bit for cooperating with the improved fastener head.

The present application is a continuation-in-part of copending application U. S. Serial No. 228,719, filed May 28, 1951.

Recessed, socketed or slotted head screws, bolts or fasteners are commonly employed in the mass production of hard goods comprised of assembled elements or parts held together by fasteners. In the mass production of such goods, speed of attachment is of the essence and many attempts have been made to improve production efficiency of assembling parts by employing specially designed recessed head fasteners and driver bits. One type of recessed head fastener which has been employed comprises a cruciform type recess in the shape of a symmetrical cross and internally configurated to provide a series of bevelled edges or faces adapted to cooperate wedgingly with a driver having complementary bevelled faces. The main disadvantage with that type fastener and driver was that considerable axial or lengthwise pressure had to be maintained on the head of the fastener with the driver otherwise the driver bit would jump out of the slot or recess during turning, especially when the driver was power driven. As a consequence, the driver would chew up the recess at the corner edges, making it difficult to obtain secure fastening and also making it difficult to maintain a high rate of production efficiency. Moreover, an ordinary screw driver could not be used with the fastener.

Another prior art fastener which has been proposed comprised a multi-faceted recess or socket internally configurated with a slight twist or spirally formed like a helix of less than one convolution. The fastener was limited in its use because of its generally complicated structure as it required a special driving element for its operation.

It is the object of the present invention to provide a recessed cross-headed fastener of simple internal configuration and capable of being fastened by a driver bit without requiring heavy longitudinal bearing pressure.

Another object is to provide a driver for screw threaded fasteners characterized by a special structure enabling the use of light bearing pressure during use.

It is also the object of the invention to provide a driver bit for screw threaded fasteners of many types having a guide point protruding from the bottom edge of the bit for correctly positioning the bit in a recessed head screw having a complementary guiding pocket therein.

Other objects will become apparent from the description and the accompanying drawing in which:

Fig. 1 is a view of the operative end of a bit or driver adapted to cooperate with the recessed screw of the invention;

Fig. 2 depicts the end view of the driver of Fig. 1 as seen from the bottom;

Fig. 3 is a plan view of the fastener showing the improved construction of the invention;

Fig. 4 illustrates a cross-section of the fastener head taken along the line 4—4 of Fig. 3;

Fig. 5 shows the plan view of another type fastener; and

Fig. 6 is a cross-sectional view of the fastener of Fig. 5 taken along line 6—6.

Referring to the figures, 1 is the shank of a driver or bit into whose end are milled four ribs 2, 3, 4, 5 separated by flutes. Down to a point 6, the diameter of a circle touching the ribs is substantially the same as the diameter of shank 1. From 6 to 7 the ribs are tapered toward the longitudinal axis 8 of shank 1, the diameter of a circle enclosing points 7 being much smaller, e. g. ⅗ of the circle enclosing points 6. The ribs terminate at 7, their lower faces forming an obtuse or even right angle with the axis 8.

The bit terminates in a guiding tip or member 9, preferably at the symmetrical center at the bottom of the bit.

The length and width of the guide tip 9 at the end of the bit depends on the depth and width of the recess in the fastener and the nature of the material of which the fastener and driver are made. Guides ³⁄₃₂″ long and wide were found satisfactory for driving screw 10 of sizes twelve to sixteen. The side wall or walls 11, depending on whether the cross-section is circular or polygonal, of the somewhat deeper and wider pocket 12 at the bottom of the recess in the head 13 of the screw is of a length, shape and direction to function as a guide for the tip 9 to prevent it from camming out of the pocket when the driver is tipped.

The guide tip or member 9 is particularly useful in combination with fasteners made of materials in which deep recesses cannot readily be formed, e. g. stainless steels. The shallowness of the recess formed by intersecting slots 14a and 14b in head 13 is compensated by forming the guide pocket 12 of substantially the same depth as the recess.

The substantially straight side wall or walls 15 of the guide 9, depending on whether its cross-section is circular or polygonal, terminate in a rounded tip 16 swivelled in the sloping bottom 17 of guide pocket 12. The entrance opening to pocket 12 is joined by a rounded rim 18 with the sloping bottom 19 of the recess. The side walls 20 of recess slots 14a and 14b also slope from the top of the screw head 13 so that, the point 9 will be guided into the pocket 12 until the bottoms of the ribs bear against the sloping bottom 19 of the recess and, therefore, the edges of the ribs between 6 and 7 are firmly engaged with the driving face or faces of the screw head within the recess. As indicated in Fig. 6, the entrance opening into the guide pocket need not be rounded.

The recess in the screw head 13 is adapted to cooperate with the bit of Figs. 1 and 2 via the two grooves 14a and 14b substantially intersecting at right angles comprising therein driving faces 21 and lagging faces 22 which are substantially parallel with or complementary to the corresponding faces of the driver ribs. The faces 21 and 22 are preferably diverging (from the bottom of the recess up) so as to permit removal of the forming tool.

The driving face is in effect an undercut part of the recess and lies in a plane which is inclined at a slight angle towards the vertical axis 8 in the direction of the screw head, while the lagging face is inclined away from the axis by the same, or preferably a somewhat larger angle. As has been stated above, the construction of the cruciform recess conforms substantially to that of the bit shown in Fig. 2, whereby the marginal edges of each driving face at the top and bottom of each slot, e. g. marginal edges 21a and 21b illustrated in Fig. 3, are in plan view substantially parallel to a median radial plane, such as a plane represented by line X—X, passing through the bottom of the recess. The corresponding marginal edges of the bit are shown in Fig. 2 as lines 7a and 7b looking at the bit from a bottom view. It will be similarly noted that marginal edge 7a as viewed from the bottom end of the bit is substantially parallel to a median radial plane represented by line Y—Y passing through the rib as shown. On account of the undercut or inclination of the driving faces, the driver in cooperating with the driving faces of the recess will be urged downwardly toward the bottom 19 of the recess, rather than urged outwardly, out of engagement with the driving face, as would be the case if the driving faces were inclined in the opposite direction as in the prior art.

An important advantage of the invention is that the driving faces are substantially flat and, therefore, easy to fabricate as well as easy to operate by the ordinary flat screw driver.

I have found that good results may be obtained with fasteners and drivers having driving faces inclined at an angle of up to about 5 degrees, preferably from about 2 to 5 degrees, to the longitudinal axis of the screw or the bit. However, even smaller inclinations show some benefit and larger inclinations are possible. As long as the driving face of the screw is undercut to an angle, no matter how small, it will operate to urge the bit inwardly to the bottom of the recess. Among the important factors are the depth and width of the recess, the removability of the recess forming tool, and the easy insertability and removability of the driver.

The driver, on account of its sloping sides between points 6 and 7, may be employed for driving fasteners of many sizes and having recesses of greater width than is indicated in Fig. 1. The ribs will engage the driving faces and will be urged inwardly to the bottom of the recess without the need of exerting undue pressure on the head of the screw, because the guiding pin 9 and the lead angle of the driving faces will jointly and severally insure that. In the absence of the undercut driving face or both of these features, power driven bits will generally be cammed out or jump out of the recess or will not be urged to the bottom unless much greater pressure is exerted on the head of the screw than is required for drivers and/or fasteners according to the present invention.

The recess may be formed into the end of the fastener either by cold-heading it or, in the fillister head screw shown in Figs. 5 and 6, a head 30 formed on a fastener 31 has two intersecting grooves 32, 33 and a central pocket 34 cut in it. The grooves 32, 33 extend clear across head 30 instead of terminating within its confines. In both embodiments, the contour of the fastener head may be other than circular.

Preferably, though not necessarily, the configuration (viewed from above the fastener head) of the recess is such that the ordinary screw driver blade may be inserted for driving in or removing the fastener. Of course, if it is desired to prevent the unauthorized removal of a screw, then the entrance opening to the recess is so shaped as to prevent access with the ordinary flat driver blade.

Preferably, all the driving surfaces of the fastener recess and the driver are inclined toward the axes in the direction of the top of the fastener and driver, respectively. However, the advantages of the invention can at least partially be obtained with one or more driving surfaces parallel with the axis or inclined away from it, as long as at least one driving face of the fastener forms an undercut at an angle to the axis or at least a portion of the driving face is inclined or undercut.

Best results will be obtained if the guiding recess and pin are employed in fasteners and drivers all, or at least some of whose driving surfaces are inclined toward the axes. However, the guides may be employed to good advantage in fasteners and drivers having driving surfaces parallel with or inclined away from the axes.

While the various features of the invention have been described as embodied in a fastener whose head has two intersecting recesses with which cooperates a driver having four driving ribs, it is applicable to fastener heads and recesses of many other configurations in which at least one driving face can be formed into an undercut.

It will be obvious to those skilled in the art that the invention is applicable to all types of screw threaded fasteners whose upper end or head has a recess in which two or more flat driving faces are formed.

I claim:

1. A screw threaded fastener having a cruciform recess in its head comprising a plurality of substantially radially extending slots, each of said slots having side walls defining a driving and a complementary lagging face, each of said driving faces being formed as a flat undercut lying in a plane inclined at an angle of up to about 5° to a median radial plane passing through the bottom of each of said slots in the direction of the head, the marginal edges of each driving face of each slot at the top and bottom of the slot being in plan view substantially parallel to said plane, each of said lagging faces being formed as a bevel inclined downwardly into said recess towards said median plane, said lagging faces functioning as means for guiding a driver bit having transverse ribs with substantially complementary driving faces into said recess and into locking engagement with the undercut driving faces thereof, the overall configuration of said recess being such as to enable said driver to be inserted into and removed from said recess by manipulation substantially along the longitudinal axis of the driver and the screw.

2. The screw threaded fastener of claim 1 wherein the bottom of the recess contains a guide pocket having side walls substantially parallel with the longitudinal axis of the fastener, the longitudinal axis of the pocket substantially coinciding with that of the screw.

3. A screw threaded fastener having a cruciform recess in its head comprising a plurality of substantially radially extending slots, each of said slots having side walls defining a driving and a complementary lagging face, each of said driving faces being formed as a flat undercut lying in a plane inclined at an angle of up to about 5° to a median radial plane passing through the bottom of each of said slots in the direction of the head, the marginal edges of each driving face of each slot at the top and bottom of the slot being in plan view substantially parallel to said plane, each of said lagging faces being substantially parallel with each of said corresponding driving faces, said lagging faces functioning as means for guiding a driver bit having transverse ribs with substantially complementary driving faces into said recess and into locking engagement with the undercut driving faces thereof, the overall configuration of said recess being shaped as to enable said driver to be inserted into and removed from said recess by manipulation substantially along the longitudinal axis of the driver and the screw.

References Cited in the file of this patent

UNITED STATES PATENTS

| | | |
|---|---|---|
| 685,197 | Barnes | Oct. 22, 1901 |
| 1,797,390 | Wood | Mar. 24, 1931 |
| 2,058,197 | West | Oct. 20, 1936 |
| 2,268,515 | Olson | Dec. 30, 1941 |
| 2,285,460 | Purtell | June 9, 1942 |
| 2,369,852 | Purtell | Feb. 20, 1945 |
| 2,389,129 | Bishop | Nov. 20, 1945 |
| 2,538,350 | Baule | Jan. 16, 1951 |
| 2,592,462 | Phipard | Apr. 8, 1952 |
| 2,601,453 | Phipard | June 24, 1952 |
| 2,677,985 | Vaughn | May 11, 1954 |

FOREIGN PATENTS

| | | |
|---|---|---|
| 10,612 | Germany | Jan. 31, 1880 |